(12) United States Patent
Kao et al.

(10) Patent No.: US 11,171,851 B2
(45) Date of Patent: Nov. 9, 2021

(54) GROUP ALERT IN SERVER SYSTEMS

(71) Applicant: Hewlett Packard Enterprise Development LP, Houston, TX (US)

(72) Inventors: Liang-Chin Kao, Taipei (TW); Shang-Ching Hung, Taipei (TW); Shih-Chiang Chung, Taiwan (TW); An Sheng Huang, Taipei (TW); Yi-Hsun Chen, Taipei (TW)

(73) Assignee: Hewlett Packard Enterprise Development LP, Houston, TX (US)

(*) Notice: Subject to any disclaimer, the term of this patent is extended or adjusted under 35 U.S.C. 154(b) by 462 days.

(21) Appl. No.: 15/114,352

(22) PCT Filed: Jan. 28, 2014

(86) PCT No.: PCT/US2014/013310
§ 371 (c)(1),
(2) Date: Jul. 26, 2016

(87) PCT Pub. No.: WO2015/116026
PCT Pub. Date: Aug. 6, 2015

(65) Prior Publication Data
US 2017/0012842 A1   Jan. 12, 2017

(51) Int. Cl.
*H04L 12/24* (2006.01)
*H04L 12/26* (2006.01)
(Continued)

(52) U.S. Cl.
CPC .......... *H04L 43/08* (2013.01); *G06F 11/0709* (2013.01); *G06F 11/0748* (2013.01);
(Continued)

(58) Field of Classification Search
None
See application file for complete search history.

(56) References Cited

U.S. PATENT DOCUMENTS 5,471,617 A   11/1995 Farrand et al.
6,430,613 B1   8/2002 Brunet et al.
(Continued)

FOREIGN PATENT DOCUMENTS

CN    101594245    12/2009
WO    WO-2012009911    1/2012

OTHER PUBLICATIONS

Group Report Settings and Delivery, (Web Page), http://www.poweradmin.com/help/sm_5_2/config_report_delivery_settings.aspx, Retrieved Jul. 25, 2016, 5 Pgs.
(Continued)

*Primary Examiner* — Younes Naji
*Assistant Examiner* — Da T Ton
(74) *Attorney, Agent, or Firm* — Hewlett Packard Enterprise Patent Department

(57) ABSTRACT

A server system having functionality of group alerting is disclosed. Said server system comprises: a plurality of server computers having alert notification capabilities, the plurality of server computers being divided into at least one group; and a management console node managing and monitoring the plurality of server computers; wherein the alert notification is issued by a group of the at least one group of the plurality of server computers when a health problem of a server computer in said group of the at least one group of the plurality of server computers occurs.

15 Claims, 5 Drawing Sheets

(51) Int. Cl.
*G06F 11/30* (2006.01)
*G06F 11/07* (2006.01)
*G06F 11/34* (2006.01)

(52) U.S. Cl.
CPC ...... *G06F 11/0781* (2013.01); *G06F 11/3058* (2013.01); *H04L 41/0686* (2013.01); *H04L 43/16* (2013.01); *G06F 11/3409* (2013.01); *G06F 2201/81* (2013.01); *G06F 2201/86* (2013.01)

(56) References Cited

U.S. PATENT DOCUMENTS

| | | | |
|---|---|---|---|
| 7,844,866 B2 | 11/2010 | Austen et al. | |
| 8,065,365 B2 | 11/2011 | Saxena et al. | |
| 9,043,421 B1* | 5/2015 | Coon | H04L 43/0817 709/206 |
| 2002/0091944 A1 | 7/2002 | Anderson et al. | |
| 2003/0046582 A1* | 3/2003 | Black | H04L 63/1408 726/23 |
| 2005/0228880 A1 | 10/2005 | Champlin | |
| 2009/0089624 A1* | 4/2009 | Austen | G06F 11/30 714/39 |
| 2010/0083054 A1* | 4/2010 | Marvasti | G06F 11/0709 714/47.2 |
| 2010/0085196 A1* | 4/2010 | Stiver | H05K 7/20836 340/584 |
| 2012/0215876 A1* | 8/2012 | Ohtake | H04L 41/044 709/208 |
| 2013/0290791 A1 | 10/2013 | Basile et al. | |
| 2013/0310072 A1* | 11/2013 | Diem | H04L 63/104 455/456.1 |

OTHER PUBLICATIONS

HELP! Creating Different Server Groups in SCOM, (Web Page), http://www.systemcentercentral.com/forums-archive/topic/help-creating-different-server-groups-in-scom/, Retrieved Jul. 25, 2016, 4 Pgs.

International Searching Authority, The International Search Report and the Written Opinion, dated Aug. 30, 2014, 9 Pages.

Up Time Software; Servers, Networks, Applications, Services; http://www.uptimesoftware.com/alerts.php >, Retrieve Jul. 25, 2016, 3 Pgs.

Patrick Kennedy; Supermicro IPMIVew Review—Remote Server Monitoring and Management and KVM-over-IP; http://www.servethehome.com/supermicro-ipmiview-review-remote-server-monitoring-management-ipmi-20-kvm-over-ip/ >; Oct. 27, 2010.

* cited by examiner

GROUP ALERT IN SERVER SYSTEMS

TECHNICAL FIELD

The present application relates to event alerting in a server system. In particular, the present application relates to a server system having functionality of group alerting and a method for group alerting in a server system.

BACKGROUND

In a server system, system administrators usually have to manage and monitor a lot of and a variety of server computers. System administrators must take actions when any of the member server computers meets abnormal situations in order to sustain the whole server system operating normally and healthily. Different functions, areas and locations of the member server computers may encounter different types of problems. The system administrators must handle a variety of types of problems from a lot of server computers within time limits, which is a complex and urgent task.

The Intelligent Platform Management Interface (IPMI) architecture is usually applied to a server system for alerting events of any of the member computers. The IPMI is a standardized computer system interface used by system administrators for out-of-band management of computer systems and monitoring of their operation. It is a way to manage a computer that may be powered off or be otherwise unresponsive by using a network connection to the hardware rather than to an operating system or login shell.

In the conventional IPMI supported server system platform, an alert notification is issued by individual computer systems. This is very useful for a small business company. However, for large scale enterprises, such as Google, Yahoo, Facebook, which have very large data centers, this technology more likely focuses on a group of servers management which servers are classified into groups by areas, locations and functions. Therefore, a method for group alerting in such a server system platform is required.

CONTENT OF THE INVENTION

The present application proposes an invention of group alerting for the server system in the large scale enterprise with very large data center, such that an administrator can monitor the large data center by predefined groups.

According to one aspect of the present application, a server system having functionality of group alerting is disclosed. Said server system comprises: a plurality of server computers having alert notification capabilities, the plurality of server computers being divided into at least one group; and a management console node managing and monitoring the plurality of server computers; wherein the alert notification is issued as a group event by a group of the at least one group of the plurality of server computers when an event of a server computer in said group of the at least one group of the plurality of server computers occurs.

According to another aspect of the present application, a method for group alerting in a server system is disclosed. Said method comprises: managing and monitoring a plurality of server computers by a management console node; dividing the plurality of server computers in the server system into at least one group, each of the plurality of server computers having alert notification capabilities; and issuing the alert notification as a group event by a group of the at least one group of the plurality of server computers when an event of a server computer in said group of the at least one group of the plurality of server computers occurs.

BRIEF DESCRIPTION OF THE DRAWINGS

Various features and advantages of the disclosed embodiments will be apparent from the detailed description which follows, taken in conjunction with the accompanying drawings, which together illustrate, by way of example, features of the disclosed embodiments.

DETAILED DESCRIPTION

Figure 1:
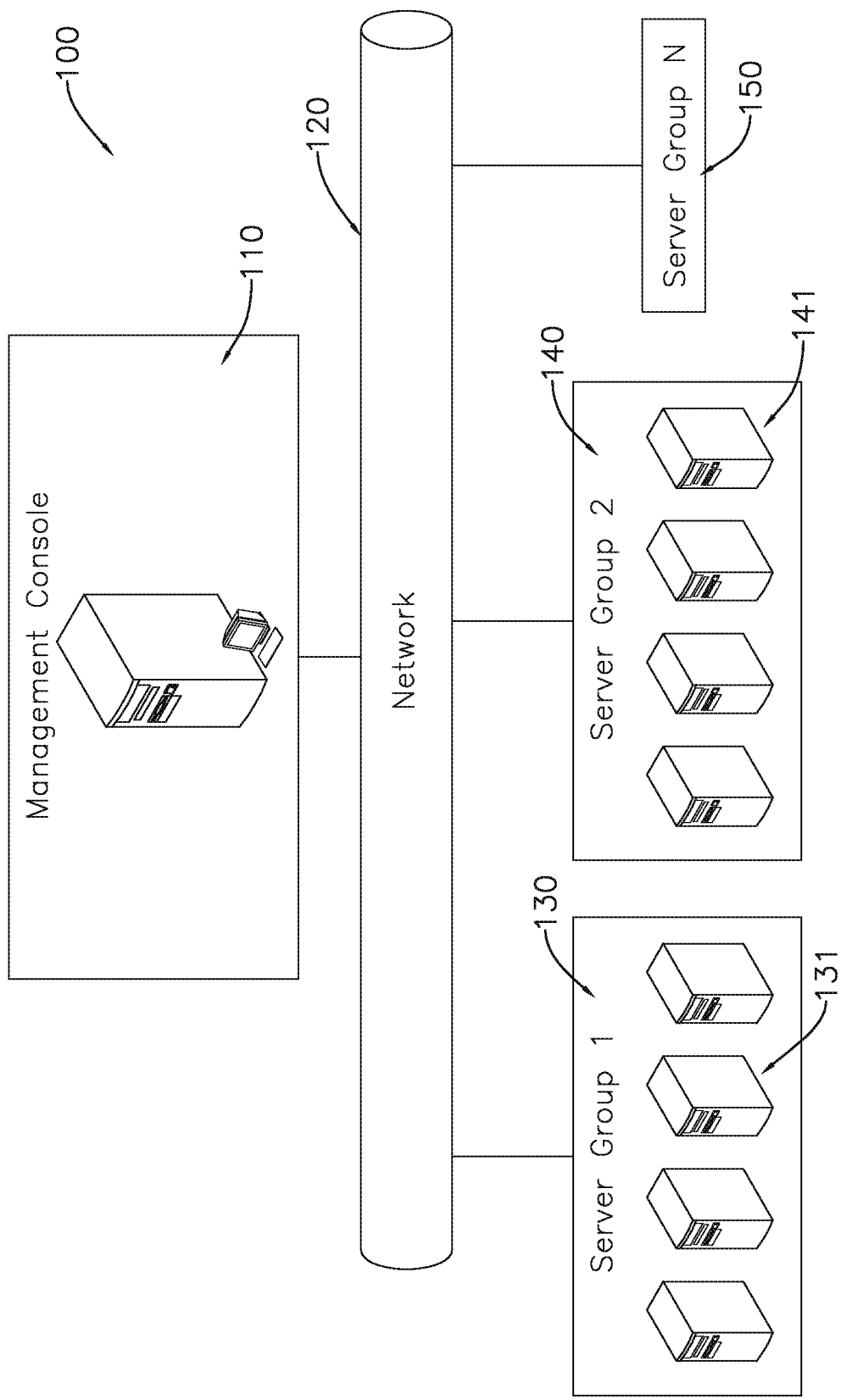
FIG. 1 illustrates a block diagram of the groups of servers in a server system of the present invention.

FIG. 1 illustrates a block diagram of a server system (100) of the present invention. The server system (100) comprises a management console node (110) and a plurality of server computers communicating with each other via a network (120). The plurality of server computers is divided into at least one group, i.e., server group 1 (130), server group 2 (140), . . . server group N (150). The management console node (110) may be, but not limited to, a server computer, a personal computer, or a handheld computing device. An administrator of the server system may classify the plurality of server computers in the server system to different groups by their areas, locations, or functions.

The management console node (110) manages and monitors the operation and the health/utilization status of the plurality of server computers. When an event of a server computer in the plurality of server computers occurs, an alert notification will not be issued by said server computer having the event. On the contrary, the alert notification will be issued by a group of the at least one group of the plurality of server computers, to which said server computer belongs. Hence, the issued alert notification reports a group event of a specific group in the server system rather than an individual event of a specific server computer in the server system. Namely, if a server computer (131) in server group 1 (130) has an event, the alert notification will be issued by server group 1 (130); if a server computer (141) in server group 2 (140) has an event, the alert notification will be issued by server group 2 (140); and if a server computer in server group N (150) has an event, the alert notification will be issued by server group N (150), instead of said server computer itself. The alert notification is sent to the management console node (110), such that the management console node (110) can locate the group including said server computer having the event.

Each of the plurality of server computers in the server system (100) may have a built-in IPMI supported Baseboard Management Controller (BMC) and does not need any extra hardware to support the group alerting of the server system of the present invention.

Figure 2:
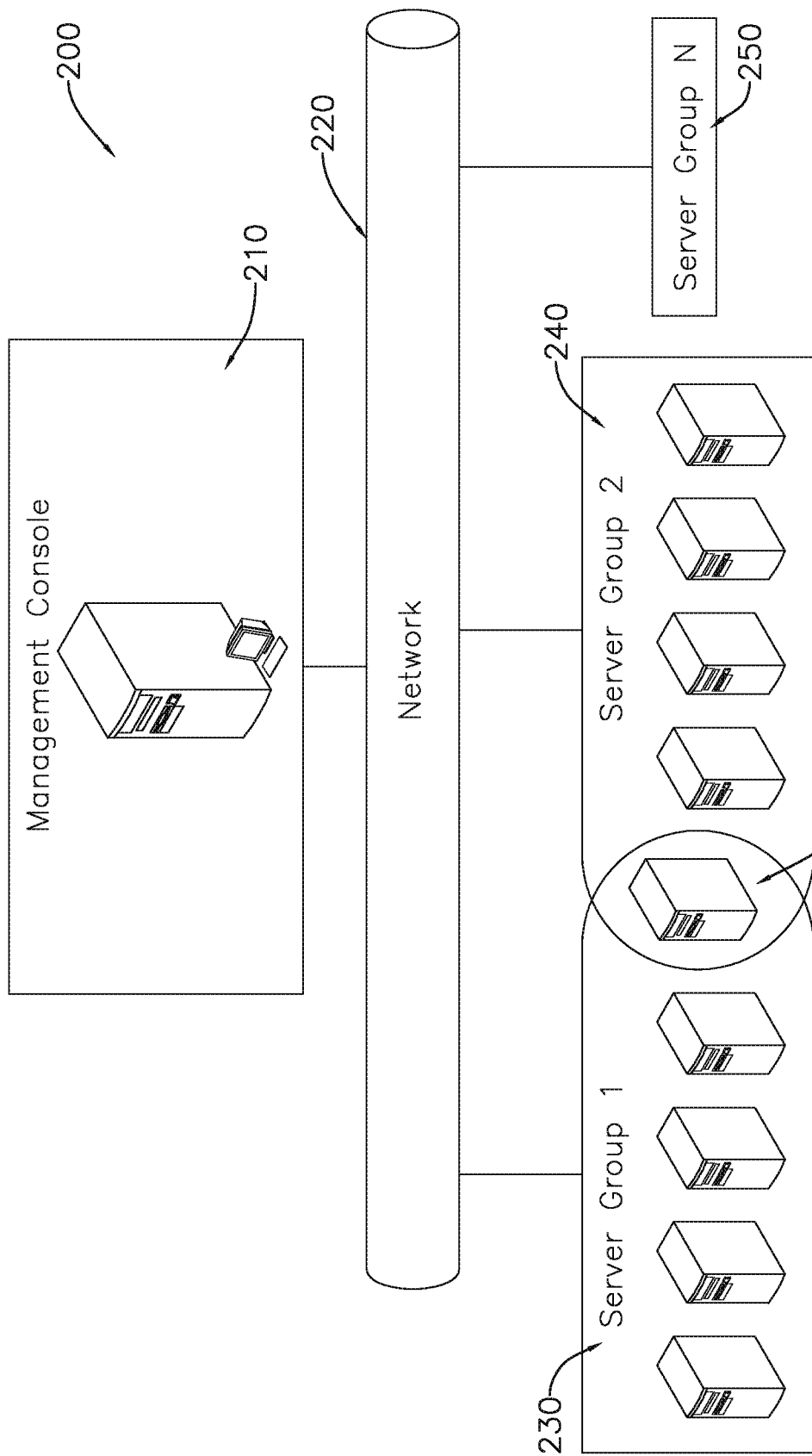
FIG. 2 illustrates a block diagram of another server system of the present invention.

FIG. 2 illustrates a block diagram of another server system (200) of the present invention. Similar to the server system (100) illustrated in FIG. 1, the server system (200) comprises a management console node (210) and a plurality of server computers communicating each other via a network (220). The plurality of server computers is divided into at least one group. i.e., server group 1 (230), server group 2 (240), . . . server group N (250). However, based on different criteria of dividing the plurality of server computers into different groups, the same server computer (234) may belong to different groups. For example, the administrator divides portions of the plurality of server computers into server group 1 (230) according to their location A and divides other portions of the plurality of server computers into server group 2 (240) according to their function B. If the server computer (234) is located at the location A and has the function B, the server computer (234) may belong to both of server group 1 (230) and server group 2 (240). The server computer (234) may issue its events through server group 1 (230) or server group 2 (240) depending on the group alert policies. For example, the server computer (234) may issue an event of CPU utilization over 90%, which belongs to a functional event, through server group 2 (240) and issue an event of unexpected shutdown, which belongs to a health event at a specific location, through server group 1 (230).

Figure 3:
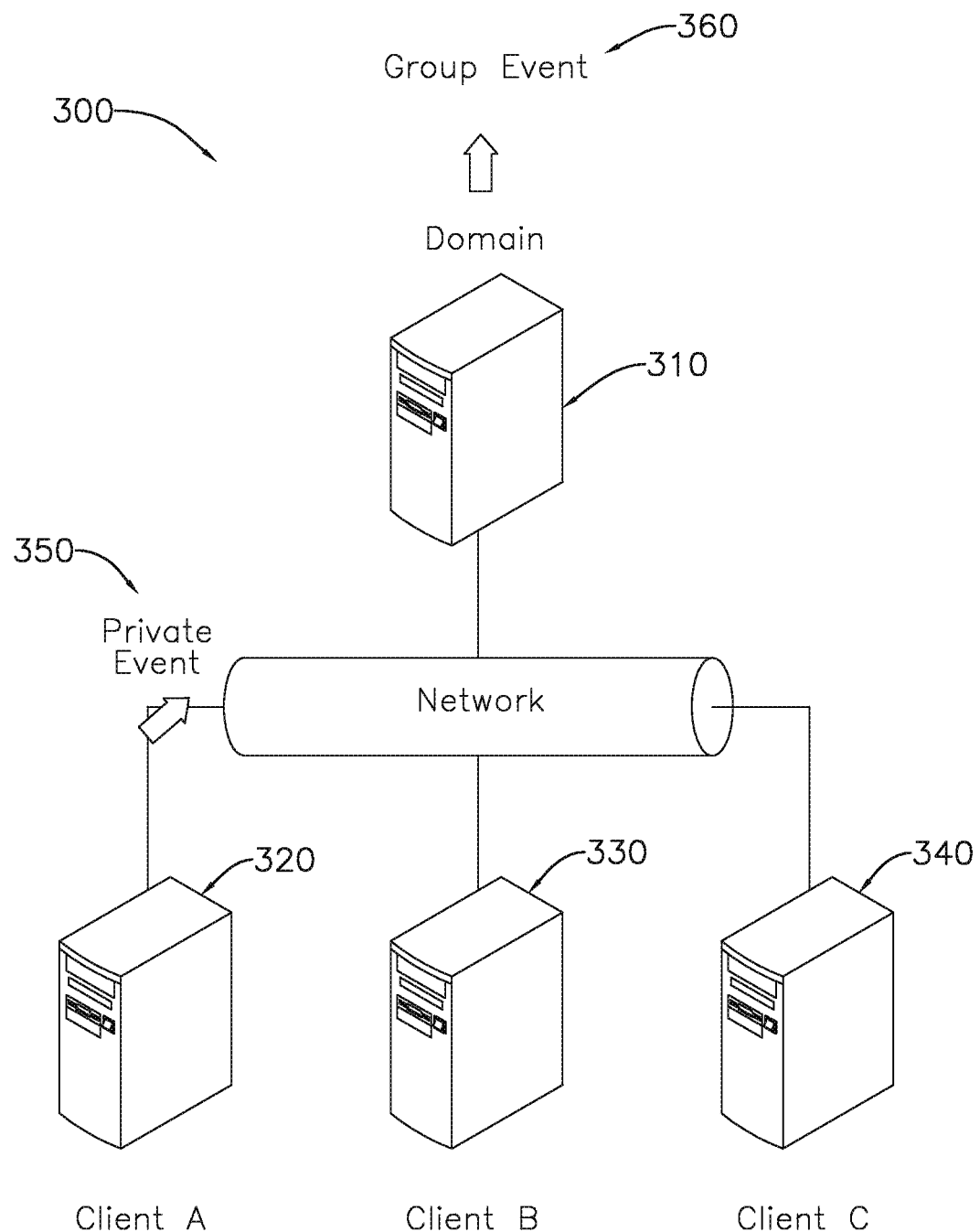
FIG. 3 illustrates an operation mechanism of a group event in one of at least one group of a server system of the present invention.

FIG. 3 illustrates an operation mechanism of a group event in one (300) of at least one group of a server system of the present invention. Each group in the server system comprises a domain node (310) and at least one client server computer (320, 330, 340). The domain node (310) may be, but not limited to, a server computer, a personal computer, or a handheld computing device.

Based on different criteria of dividing the plurality of server computers into different groups, a domain node in one group of the server system may also be a member server computer in another group of the server system. For example, as illustrated in FIG. 2, the server computer (234) may act as the domain node of server group 2 (240) and issue the group events of server group 2 (240) to the management console node (210). The server computer (234) may also be a member server computer of server group 1 (230) and send its own events to the domain node (not shown in FIG. 2) of server group 1 (230) rather than the management console node (210). Namely, the server computer (234) is simultaneously the domain node of server group 2 (240) and one of the member server computers of server group 1 (230).

When an event of a client server computer (320) occurs, the client server computer (320) cannot send a normal alert to the management console node. Instead, the client server computer (320) sends a private event (350), which can only be received by the domain node (310). After receiving the private event (350) issued by the client server computer (320), the domain node (310) needs to decide that the current event (350) has reached predefined threshold values and needs to be sent to the management console node as a group event (360) according to a predefined policy. The issued group event (360) may comprise, for example, a group health alert, a group utilization alert, a group hardware failure alert and other group alerts indicating any event that impacts the normal operations of the server computers. Examples of group alerting policies are listed in the following table. However, the illustrated examples of group alerting policies do not limit the claimed scope of the present invention. Any modification of the alerting policies may easily be conceived by a person skilled in the art based on the actual requirements when managing and monitoring a server system.

Group Alert (Health/Utilization/Hardware Failure)

TABLE 1

Examples of Group Alerting Policies

| Type | Event | STH Single system threshold | GTH Alert Percentage in group threshold | When to trigger event |
| --- | --- | --- | --- | --- |
| Group Health Critical Alert | Over CPU temperature | CPU temperature over limit (100° C.) | 10% (In a group of 100 servers, that is 10) | STH = true and GTH = true |
| Group Health Critical Alert | System unexpected shutdown | System unexpected shutdown | 3% (In a group of 100 servers, that is 3) | STH = true and GTH = true |
| Group Health Warning Alert | Over CPU temperature | CPU temperature over limit (100° C.) | 1% (In a group of 100 servers, that is 1) | STH = true and GTH = true |
| Group Utilization Alert | Over CPU utilization | CPU average utilization over 90% in last one minute | 80% (In a group of 100 servers, that is 80) | STH = true and GTH = true |
| Group Utilization Alert | Over network throughput utilization | average network throughput over 80 Mb/s in last five minutes | 20% (In a group of 100 servers, that is 20) | STH = true and GTH = true |
| Group Hardware Failure Warning Alert | Disk failure | Disk failure (Recoverable) | 3% (In a group of 100 servers, that is 3) | STH = true and GTH = true |

TABLE 1-continued

Examples of Group Alerting Policies

| Type | Event | STH Single system threshold | GTH Alert Percentage in group threshold | When to trigger event |
|---|---|---|---|---|
| Group Hardware Failure Critical Alert | Disk failure | Disk failure (Unrecoverable) | 1% (In a group of 100 servers, that is 3) | STH = true and GTH = true |
| Group Hardware Failure Warning Alert | Power failure | Redundant Power supply failure | 3% (In a group of 100 servers, that is 3) | STH = true and GTH = true |
| Group Hardware Failure Critical Alert | Power failure | System shutdown due to power supply failure | 1% (In a group of 100 servers, that is 3) | STH = true and GTH = true |
| Group Hardware Failure Critical Alert | Unexpected shutdown failure | Unexpected system shutdown | 1% (In a group of 100 servers, that is 3) | STH = true and GTH = true |

The administrator may set different predefined group alerting policies for each domain node in each server group of the plurality of server computers (as listed in Table 1). For example, the administrator may set an over temperature threshold value of 100° C. for the CPU of each member server computer in server group 1 (130). The member server computer will send a private event (350) to a domain node of server group 1 (130) when it reaches a CPU temperature over 100° C. The domain node of server group 1 (130) will accumulate and count total private events sent by the member server computers. The administrator may further set a group over temperature event of 10% of the member server computers alerting the event of over CPU temperature for the domain node. The domain node will send a group event (360) to the management console node (110) when it accumulates that over 10% of the member server computers have issued the private events of over CPU temperature. After the management console node (110) receiving the group event from the domain node, the administrator may immediately take actions to prevent the member server computers from being crashed. For example, the administrator may immediately cool down the room temperature for server group 1 (130), share work loads of server group 1 (130) to other server groups, or take any other actions that may reduce the temperature of the CPU of the member server computers in server group 1 (130). For server group 2 (140), due to lower temperature endurance of the CPU of the server computers, the administrator may set a lower over temperature threshold value of 80° C. (for example) for the CPU of each member server computer and set a group over temperature threshold value of 5% of the member server computers alerting the event of over CPU temperature for the domain node, such that the administrator may be informed with a lower threshold for the issue of CPU temperature in server group 2 (140).

The other example is that the administrator may set an average network throughput threshold value of over 80 Mb/s in last five minutes for each member server computer and set an over network throughput utilization group event of over 20% of the member server computers reaching the threshold value of average 80 Mb/s throughput in the last five minutes. The administrator may monitor whether each of the groups of the server system incurs abnormally large data transmissions at the network, which may be caused by a virus attack or by a simultaneous file downloading in a specific area.

Figure 4:
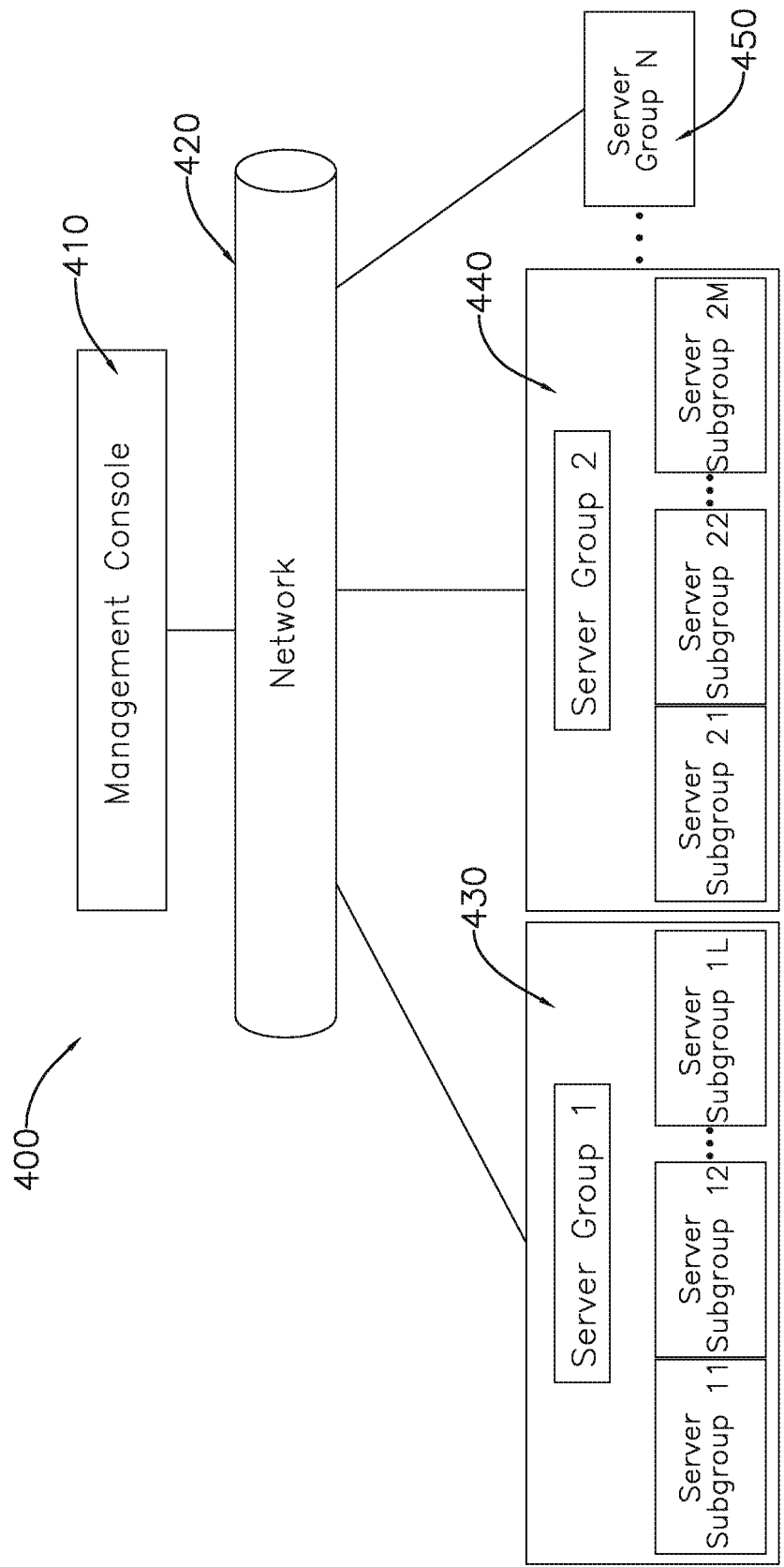
FIG. 4 illustrates a block diagram of a further server system of the present invention.

FIG. 4 illustrates a block diagram of a further server system (400) of the present invention. Similar to the server system (100) illustrated in FIG. 1, the server system (400) comprises a management console node (410) and a plurality of server computers communicating each other via a network (420). The plurality of server computers is divided into at least one group, i.e., server group 1 (430), server group 2 (440), . . . server group N (450). Due to the scale of the server system (400) being large and complex, the administrator may further classify the server computers in server group 1 (430) or in server group 2 (440) to different subgroups by their more detailed areas, locations, or functions. Each subgroup in each group of the server system also comprises its own domain node and at least one client server computer, such that the management console node (410) may focus on fewer groups in order to more efficiently manage and monitor the server system.

Figure 5:
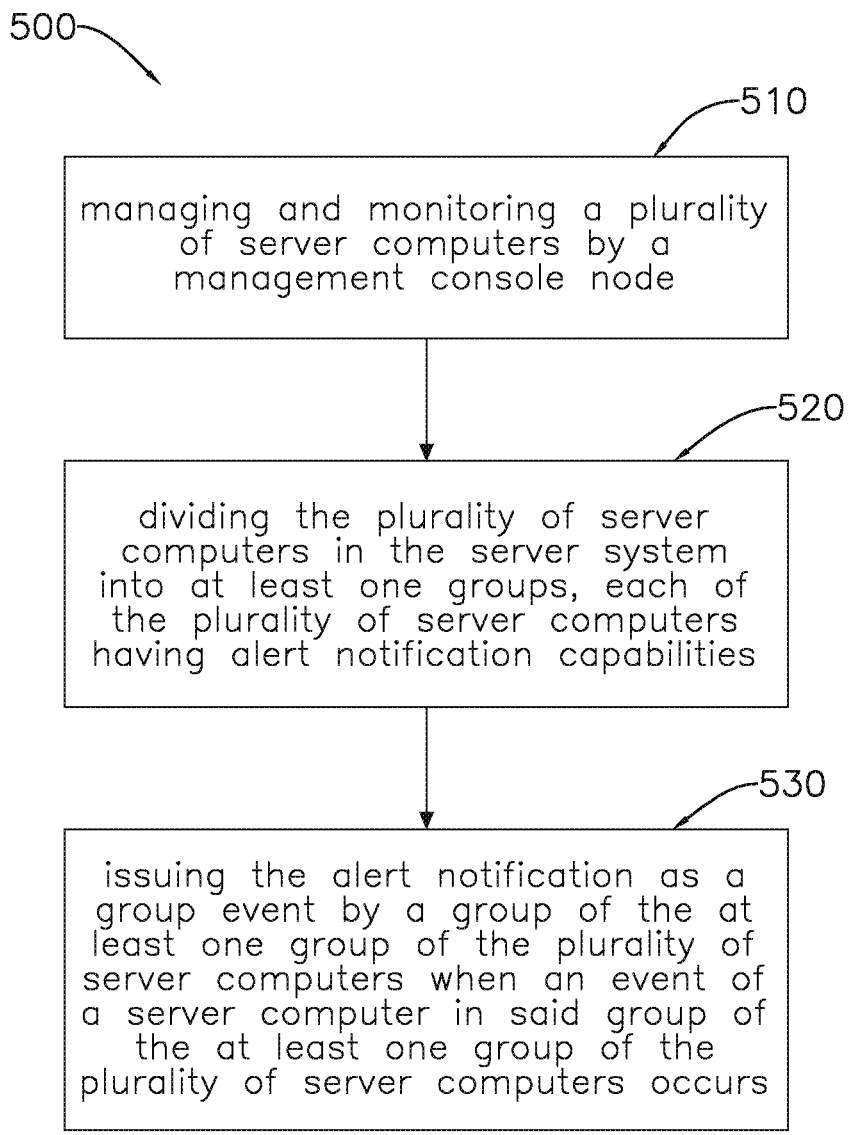
FIG. 5 illustrates a method for group alerting in a server system of the present invention.

According to the illustrated server system of the present invention, a method (500) for group alerting in a server system is also illustrated in FIG. 5. Said method (500) for group alerting in the server system may manage and monitor a plurality of server computers by a management console node (510), divide the plurality of server computers in the server system into at least one group, in which each of the plurality of server computers has alert notification capabilities (520), and issues the alert notification as a group event by a group of the at least one group of the plurality of server computers when an event of a server computer in said group of the at least one group of the plurality of server computers occurs (530).

The claimed server system and method of the present application have many advantages over the conventional server system platform. For example, the group alerting allows an administrator to monitor the server system by group instead of individual server computers, such that identifying and locating group problems in a very large data center becomes easier than locating each of the individual server computers. Only deployment of a new domain node in each of the groups is required without adding any new hardware and changing any hardware configurations on each existing server computer. The group alerting for the server system of the present application may be implemented merely by a firmware update without any extra efforts.

The aforesaid detailed descriptions illustrate the preferred embodiments of the present application. However, the scope of the claimed invention should not be limited by any of the above-described exemplary embodiments, but should be defined only in accordance with the following claims and their equivalents.

What is claimed is:

1. A server system comprising:
a plurality of server computers having alert notification capabilities, the plurality of server computers being divided into at least a first group according to a location and a second group according to a function, wherein the plurality of server computers comprise a first server computer that belongs to both the first group and the second group,
wherein the first server computer is to:
responsive to a private event of the first server computer, selectively send a notification of the private event to a domain node of a selected group of the first group and the second group, the first server computer to select the first group as the selected group responsive to the private event being related to the location, and the first server computer to select the second group as the selected group responsive to the private event being related to the function, and
wherein the selected group is to issue a group event responsive to the notification of the private event of the first server computer,
wherein the domain node is to:
accumulate the private event with another private event notified by another server computer of the plurality of server computers, to produce accumulated private events, and
determine whether to issue the group event to a management console node responsive to whether the accumulated private events satisfy a group threshold of a predefined policy.

2. The server system of claim 1, wherein the selected group is to send the group event to the management console node that manages and monitors the plurality of server computers.

3. The server system of claim 1, wherein the first group comprises a first domain node, and when the selected group is the first group, the first domain node is to:
receive the notification of the private event from the first server computer, and
issue the group event to the management console node that manages and monitors the plurality of server computers.

4. The server system of claim 3, wherein the second group comprises a second domain node, and when the selected group is the second group, the second domain node is to:
receive the notification of the private event from the first server computer, and
issue the group event to the management console node.

5. The server system of claim 1, wherein the group event is selected from among a group health alert, a group utilization alert, and a group hardware failure alert.

6. The server system of claim 1, wherein each of the plurality of server computers has a built-in Intelligent Platform Management Interface (IPMI) supported Baseboard Management Controller (BMC).

7. The server system of claim 1, wherein the domain node is to:
determine that the accumulated private events satisfy the group threshold responsive to at least a specified amount of server computers in the selected group violating an individual threshold, wherein the group threshold comprises the specified amount.

8. The server system of claim 1, wherein the first group or the second group is further divided into subgroups, and each subgroup of the subgroups includes a respective domain node and a respective member server computer.

9. The server system of claim 7, wherein at least the specified amount of the server computers in the selected group violating the individual threshold comprises a specified percentage of the server computers in the selected group violating the individual threshold, and wherein the group threshold comprises the specified percentage.

10. A method of group alerting in a server system, comprising:
managing and monitoring a plurality of server computers by a management console node, the plurality of server computers divided into at least a first group according to a location and a second group according to a function, wherein the plurality of server computers comprise a first server computer that belongs to both the first group and the second group;
responsive to a private event of the first server computer, selectively sending, by the first server computer, a notification of the private event to a domain node of a selected group of the first group and the second group, the first server computer selecting the first group as the selected group responsive to the first server computer determining that the private event is related to the location, and the first server computer selecting the second group as the selected group responsive to the first server computer determining that the private event is related to the function;
accumulating, by the domain node, the private event with another private event notified by another server computer of the plurality of server computers, to produce accumulated private events;
determining, by the domain node, whether to issue a group event to the management console node responsive to whether the accumulated private events satisfy a group threshold of a predefined policy; and
issuing, by the selected group, the group event responsive to the notification of the private event of the first server computer.

11. The method of claim 10, comprising:
determining, by the domain node, that the accumulated private events satisfy the group threshold responsive to at least a specified amount of server computers in the selected group violating an individual threshold, wherein the group threshold comprises the specified amount.

12. The method of claim 10, wherein the first group or the second group is further divided into subgroups, and each subgroup of the subgroups includes a respective domain node and a respective member server computer.

13. The method of claim 10, wherein a given server computer of the plurality of server computers is the domain node of the selected group, and a member server computer of another group of server computers that is part of the plurality of server computers.

14. A non-transitory computer-readable storage medium comprising instructions that upon execution cause a domain computer node of a given group of server computers to:

receive, from a first server computer responsive to a private event of the first server computer, a notification of the private event, wherein the first server computer is part of a plurality of server computers divided into at least a first group according to a location and a second group according to a function, wherein the first server computer belongs to both the first group and the second group, wherein the notification of the private event is issued by the first server computer to the given group that is one of the first group and the second group, the given group to which the notification of the private event is issued being the first group responsive to the private event being related to the location, and the given group to which the notification of the private event is issued being the second group responsive to the private event being related to the function;

accumulate the private event with another private event notified by another server computer of the plurality of server computers, to produce accumulated private events;

determine whether to issue a group event responsive to whether the accumulated private events satisfy a group threshold of a predefined policy; and issue the group event to a management console node responsive to the notification of the private event from the first server computer.

15. The non-transitory computer-readable storage medium of claim 14, wherein the instructions upon execution cause the domain computer node to:

determine that the accumulated private events satisfy the group threshold responsive to at least a specified percentage of server computers in the given group violating an individual threshold, wherein the group threshold comprises the specified percentage.

\* \* \* \* \*